US007213454B2

(12) United States Patent
Schauer et al.

(10) Patent No.: US 7,213,454 B2
(45) Date of Patent: May 8, 2007

(54) METHOD AND APPARATUS FOR OBTAINING IMPROVED ACCURACY AND RANGE FOR AIR DATA PARAMETERS INFERRED FROM INDEPENDENT MEASUREMENTS OF INTERDEPENDENT PRESSURES

(75) Inventors: Travis Jon Schauer, Shakopee, MN (US); Derrick David Hongerholt, New Market, MN (US); Dennis James Cronin, Shakopee, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 15 days.

(21) Appl. No.: 11/099,704

(22) Filed: Apr. 6, 2005

(65) Prior Publication Data
US 2006/0225496 A1 Oct. 12, 2006

(51) Int. Cl.
*G01W 7/00* (2006.01)
(52) U.S. Cl. .................... 73/170.02; 73/182
(58) Field of Classification Search ............ 73/180, 73/170.02, 182
See application file for complete search history.

(56) References Cited

U.S. PATENT DOCUMENTS

| 3,318,146 | A | * | 5/1967 | Hagen et al. ............... 73/180 |
| 4,096,744 | A | | 6/1978 | De Leo et al. ............. 73/180 |
| 4,303,978 | A | | 12/1981 | Shaw et al. ................ 364/453 |
| 4,378,696 | A | | 4/1983 | DeLeo et al. ............... 73/180 |
| 4,378,697 | A | | 4/1983 | DeLeo et al. ............... 73/180 |
| 4,615,213 | A | * | 10/1986 | Hagen ........................ 73/180 |
| 4,644,538 | A | | 2/1987 | Cooper et al. ............... 371/9 |
| 4,836,019 | A | * | 6/1989 | Hagen et al. ............... 73/180 |
| 4,987,542 | A | | 1/1991 | Tran | |
| 5,205,169 | A | | 4/1993 | Hagen ........................ 73/180 |
| 5,319,970 | A | | 6/1994 | Peterson et al. ............. 73/182 |
| 5,369,993 | A | | 12/1994 | Hagan ....................... 73/178 R |

(Continued)

FOREIGN PATENT DOCUMENTS

DE 37 27 906 3/1989

(Continued)

OTHER PUBLICATIONS

Stickney et al., T. M., "Total Temperature Sensors, Technical Report 5755, Revision C", Rosemount Aerospace/BFGoodrich, Jan. 1994.

(Continued)

*Primary Examiner*—Andre J. Allen
(74) *Attorney, Agent, or Firm*—John D. Veldhuis-Kroeze; Westman, Champlin & Kelly, P.A.

(57) ABSTRACT

A method of calculating a system level air data parameter for an aircraft, for example aircraft angle-of-attack (AOA) and/or angle-of-sideslip (AOS), includes measuring a plurality of local static pressures $p_i$. Next, a plurality of non-dimensional pressure ratios are each generated as a function of one of the plurality of local static pressures $p_i$, a predicted system static pressure $Ps_{predicted}$, and a predicted impact pressure $q_{c\ predicted}$. Then, the system level air data parameter is calculated as a function of the generated plurality of non-dimensional pressure ratios. Air data systems having air data computers configured to implement the method are also disclosed. The air data systems can be Flush Air Data Systems (FADS), or other types of air data systems.

20 Claims, 10 Drawing Sheets

U.S. PATENT DOCUMENTS

| | | | |
|---|---|---|---|
| 5,423,209 A | 6/1995 | Nakaya et al. | 73/182 |
| 5,485,412 A | 1/1996 | Sarkkinen et al. | 364/724.05 |
| 5,610,845 A | 3/1997 | Slabinski et al. | 364/565 |
| 5,616,861 A | 4/1997 | Hagen | 73/180 |
| 5,710,559 A | 1/1998 | Krogmann | 340/963 |
| 5,797,105 A | 8/1998 | Nakaya et al. | 701/7 |
| 5,819,188 A | 10/1998 | Vos | 70/4 |
| 5,901,272 A | 5/1999 | Schaefer, Jr. et al. | 395/22 |
| 6,073,084 A | 6/2000 | Le Tron | 702/94 |
| 6,253,166 B1 | 6/2001 | Whitmore et al. | 703/2 |
| 6,305,218 B1 | 10/2001 | Foster | 73/178 |
| 6,466,888 B1 | 10/2002 | McCool et al. | 702/144 |
| 6,561,020 B2 | 5/2003 | Glenney | 73/170.02 |
| 6,594,559 B2 | 7/2003 | Alwin et al. | 701/14 |
| 6,604,029 B2 | 8/2003 | Cronin et al. | 701/6 |
| 6,609,421 B2 | 8/2003 | Cronin et al. | 73/170.02 |
| 6,668,640 B1 * | 12/2003 | Alwin et al. | 73/170.02 |
| 6,761,057 B2 | 7/2004 | Cronin et al. | 73/1.78 |
| 2004/0122615 A1 | 6/2004 | Cronin et al. | 702/138 |
| 2006/0155506 A1 | 7/2006 | Cronin et al. | |
| 2006/0212181 A1 | 9/2006 | Cronin et al. | |

FOREIGN PATENT DOCUMENTS

| | | |
|---|---|---|
| DE | 44 10 709 A1 | 10/1995 |
| EP | 1 256 811 A2 | 11/2002 |
| EP | 1 293 784 A2 | 3/2003 |
| GB | 1176381 A | 2/1967 |
| RU | 2 041 136 C1 | 8/1995 |
| RU | 2 103 718 C1 | 1/1998 |
| WO | WO 99/32963 | 7/1999 |

OTHER PUBLICATIONS

"BFGoodrich-Aircraft Sensors Division Air Data System with SmartProbe for Fairchiled Dornier 728JET", BFGoodrich-Rosemount Aerospace, Addendum to D9820217 Rev. B, Oct. 1998, pp. 1-10.

"SmartProbe™ Air Data System for Embraer ERJ-170 & 190", BFGoodrich-Aircraft Sensors Divison, Proposal D9920133, Apr. 1999, pp. 1-65.

F.W. Hagen and Dr. H. Seidel, "Deutsche Airbus Flight Test of Rosemount Smart Probe for Distributed Air Data System", IEEE AES Systems Magazine, Apr. 1994, pp. 7-14.

Bulletin 1013, "Pitot and Pitot-Static Probes", BFGoodrich (May 1998).

Rohloff et al., T. J., "Air Data Sensing from Surface Pressure Measurements Using a Neural Network Method", AIAA Journal, Vo. 36, No. 11, Nov. 1998, pp. 2094-2101.

Rohloff et al., T.J., "Fault-Tolerant Neural Network Algorithm for Flush Air Data Sensing", Journal of Aircraft, vol. 36, No. 3, May-Jun. 1999, pp. 541-549.

Rohloff, T.J., "Fault Tolerance and Extrapolation Stability of a Neural Network Air-Data Estimator", Journal of Aircraft, vol. 36, No. 3, May-Jun. 1999, pp. 571-576.

"What is an Artificial Neural Network?", Battelle Memorial Institute (Copyright 1997), (Publication at least by Apr. 9, 2001), http://www.emsl.pnl.gov:2080/proj/neuron/neural/what.html.

C. Stergiou, "What is a Neural Network?", (Publication at least by Apr. 9, 2001), http://www.doc.ic.ac.uk/~nd/surprise_96/journal/vol1/cs11/article1.html.

D. Clark, "An Introduction to Neural Networks", Copyright 1991, 1997 (Publication at least by Apr. 9, 2001), http://members.home.net/neuralnet/introtonn/index.htm.

Rohloff et al., T. J., "Air Data Sensing from Surface Pressure Measurements Using a Neural Network Method", AIAA Journal, vol. 36, No. 11, pp. 2095-2101, Nov. 1998.

Rohloff et al., T. J., "Fault-Tolerance Neural Network Algorithm for Flush Air Data Sensing", Journal of Aircraft, vol. 36, No. 3, pp. 571-576May-Jun. 1999.

Search Report issued by the U.K. Patent Office in Application No. GB0605207.0.

U.S. Appl. No. 10/977,442, filed Oct. 29, 2004, entitled "Fault Isolation Method and Apparatus in Artificial Intelligence Based Air Data Systems".

Search Report dated Jan. 9, 2006 for Application No. GB0519751.2.

* cited by examiner

METHOD AND APPARATUS FOR OBTAINING IMPROVED ACCURACY AND RANGE FOR AIR DATA PARAMETERS INFERRED FROM INDEPENDENT MEASUREMENTS OF INTERDEPENDENT PRESSURES

FIELD OF THE INVENTION

The present invention relates generally to Flush Air Data Systems (FADS) and other types of air data systems used on aircraft. More particularly, the present invention relates to methods and apparatus for improving the accuracy, reliability and/or range of air data parameters that are inferred from independent measurements of pressures that have interdependencies between each other.

BACKGROUND OF THE INVENTION

Flush air data systems are increasingly being used or proposed on air vehicles or aircraft (manned or unmanned). A FADS typically utilizes several flush or semi-flush static pressure ports on the exterior of an aircraft to measure local static pressures at various positions. The pressure or pressure values measured by the individual ports are combined using some form of algorithm(s) into system (global or aircraft level) air data parameters for the aircraft. Examples of these system air data parameters for the aircraft include angle-of-attack (AOA), angle-of-sideslip (AOS), Mach number, etc. Other well known system air data parameters for the aircraft can also be derived from estimates of static and total pressure and their rates of change.

Flush air data systems provide numerous advantages that make their use desirable for certain aircraft or in certain environments. For example, the flush or semi-flush static pressure ports can result in less drag on the aircraft than some other types of pressure sensing devices. Additionally, the flush or semi-flush static pressure sensing ports experience less ice build-up than some other types of pressure sensing devices. Other advantages of a FADS can include, for example, lower observability than some probe-style air data systems.

Suppose a FADS includes N flush static ports, each individually measuring a single local pressure value $p_i$ related to its perspective location on the aircraft. By way of example, a traditional FADS might typically include approximately five pressure sensing ports (N=5) positioned on the aircraft, though other numbers of ports can be used instead. Using one or more algorithms, these N local pressure values $p_i$ can be combined to infer the individual pieces necessary for an air data system, e.g., total pressure Pt, static pressure Ps, AOA and AOS. A wide variety of algorithms can be used provide these inferred air data parameters. For example, algorithms used in conventional five hole spherical head air data sensing probes can be used. Other algorithms that can be used include, for example, those based on multi-dimensional look-up tables, higher order multi-variable polynomial curve fitting, Kalman filters, etc. Increasingly, it has been proposed that the pressures or pressure values $p_i$ be combined using some form of artificial intelligence algorithms, e.g., neural networks (NNs), support vector machines (SVMs), etc.

One shortcoming of current approaches to FADS relates to the use of traditional methods to estimate AOA and AOS. Traditional methods use only a couple of ports (which measure local static pressures $p_i$) to estimate AOA and AOS before the estimates are refined using neural networks or other artificial intelligence algorithms. However, in this approach, if one port is lost due to a bird strike, power failure, etc., the entire system is lost. Thus, there is a need in the art to increase reliability, accuracy, and redundancy in FADS and other types of air data systems.

Embodiments of the present invention provide solutions to these and/or other problems, and offer other advantages over the prior art.

SUMMARY OF THE INVENTION

A method of calculating a system level air data parameter for an aircraft, for example aircraft angle of attack (AOA) and/or angle of sideslip (AOS), includes measuring a plurality of local static pressures $p_i$. Next, a plurality of non-dimensional pressure ratios are each generated as a function of one of the plurality of local static pressures $p_i$, a predicted system static pressure $Ps_{predicted}$, and a predicted impact pressure $q_{c\ predicted}$. Then, the system level air data parameter is calculated as a function of the generated plurality of non-dimensional pressure ratios. Air data systems having air data computers configured to implement the method are also disclosed. The air data systems can be Flush Air Data Systems (FADS), or other types of air data systems.

Other features and benefits that characterize embodiments of the present invention will be apparent upon reading the following detailed description and review of the associated drawings.

BRIEF DESCRIPTION OF THE DRAWINGS

FIG. 2 is a diagrammatic illustration of an air data system configured to implement methods of the present invention.

DETAILED DESCRIPTION OF ILLUSTRATIVE EMBODIMENTS

Figure 1:
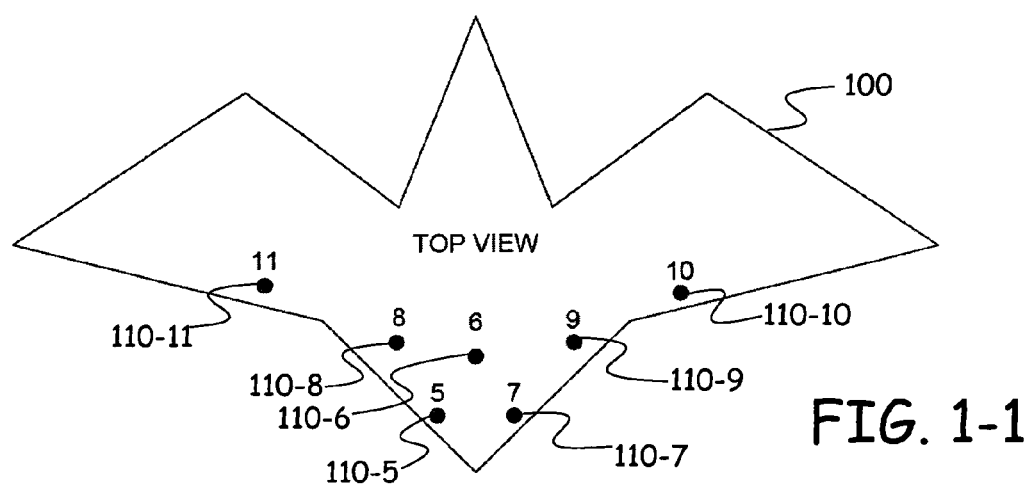
FIGS. 1-1 and 1-2 are diagrammatic illustrations of flush air data pressure sensing ports on an aircraft as seen from top and bottom views, respectively, in an example embodiment.
Figures 1, 2:
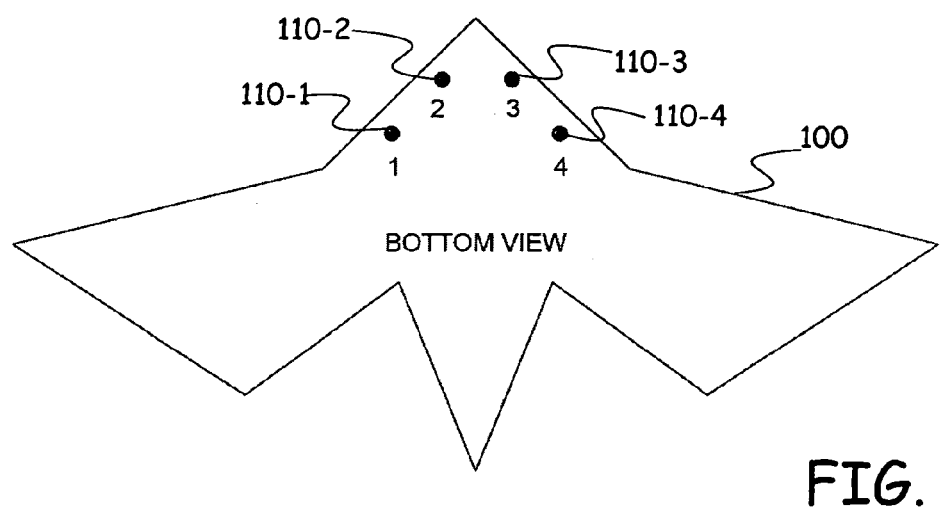
Figure 2:
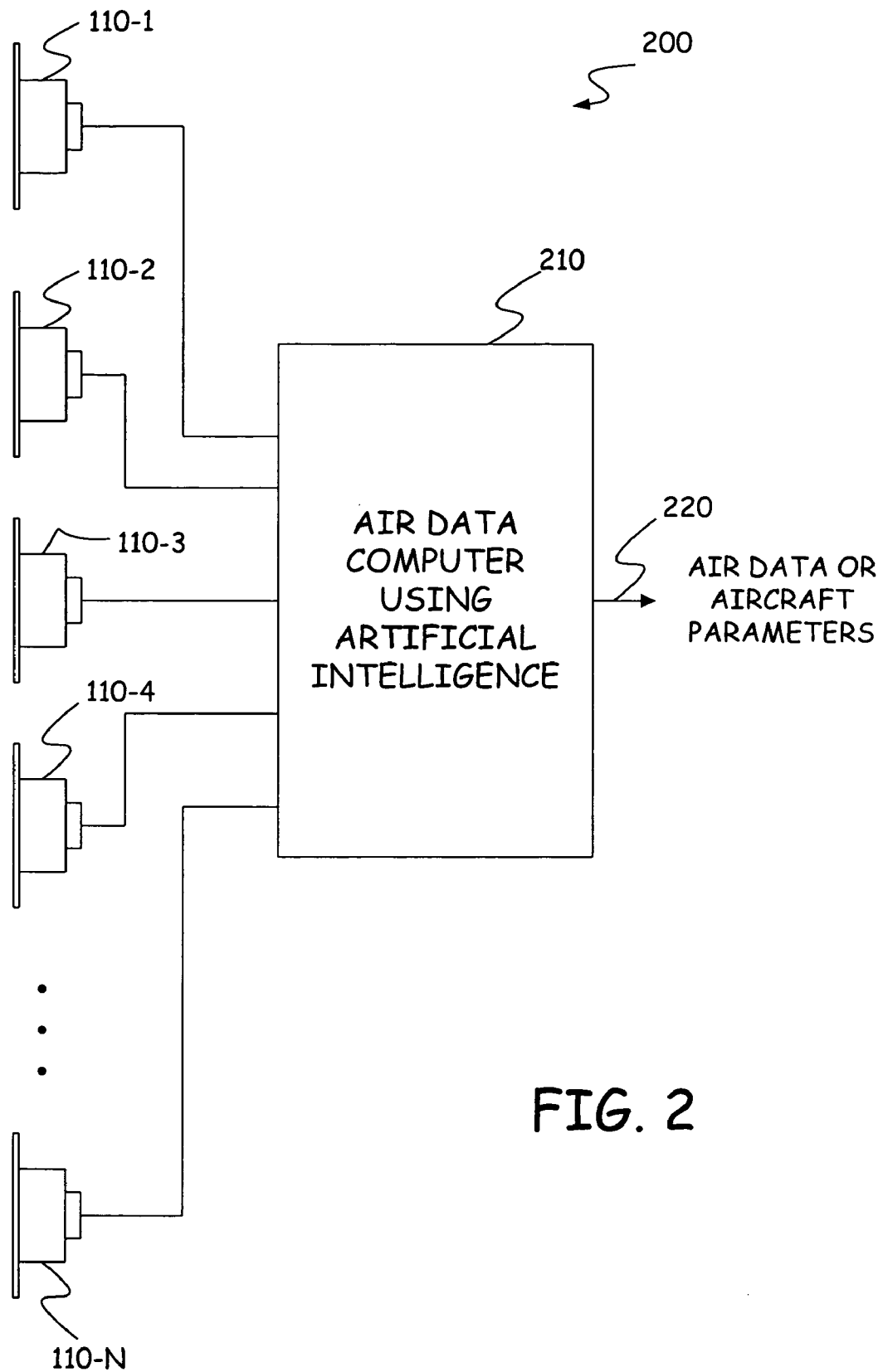

FIGS. 1-1 and 1-2 are diagrammatic illustrations, respectively in top and bottom views, of an aircraft or air vehicle 100 that employs a flush air data system (FADS) in accordance with example embodiments of the present invention. Flush air data systems are generally known in the art. For example, aspects of one such FADS is described in U.S. Pat. No. 6,253,166 issued to Whitmore et al. on Jun. 26, 2001 and entitled STABLE ALGORITHM FOR ESTIMATING AIRDATA FROM FLUSH SURFACE PRESSURE MEASUREMENTS. Other examples of FADS or aspects of FADS are described in: (1) *Air Data Sensing from Surface Pressure Measurements Using a Neural Network*, Method AIAA Journal, vol. 36, no. 11, pp. 2094–2101(8) (1 Nov. 1998) by Rohloff T. J., Angeles L., Whitmore S. A., and Catton I; (2) *Fault-Tolerant Neural Network Algorithm for Flush Air Data Sensing*, Journal of Aircraft, vol. 36, iss. 3, pp. 541–549(9) (1 May 1999) by Rohloff T. J., Whitmore S. A., and Catton I; (3) *Fault Tolerance and Extrapolation Stability of a Neural Network Air-Data Estimator*, Journal of Aircraft, vol. 36, iss. 3, pp. 571–576(6) (1 May 1999) by Rohloff T. J. and Catton I; and (4) *Failure Management Scheme for Use in a Flush Air Data System*, Aircraft Design 4, pp. 151–162 (2001) by C. V. Srinatha Sastry, K. S. Raman, and B. Lakshman Babu.

The FADS employed by aircraft 100 includes, in one illustrated example, eleven flush (or semi-flush) static pressure sensing ports 110 (reference numbers 110-1 through 110-11) positioned at various locations on the exterior of the vehicle. The individual ports 110 each measure a single local static pressure value $p_i$ related to their respective locations on the aircraft. These pressure values are then combined, using some form of artificial intelligence algorithms (neural networks, support vector machines, etc), to generate system air data parameters such as aircraft AOA and AOS. While FIGS. 1-1 and 1-2 illustrate eleven static pressure sensing ports in particular locations, the particular number and locations of ports 110 can vary as desired for the particular aircraft and application. Other examples of FADS as described herein use N static pressure sensing ports. The present invention is thus not limited to FADS having any particular number of static pressure sensing ports, or to the particular port locations shown in FIGS. 1-1 and 1-2. Further, the present invention is not limited to FADS, but can instead be used more generally in air data systems that generate system air data parameters as functions of multiple local static pressures, and particularly those using artificial intelligence algorithms to do so.

FIG. 2 is a diagrammatic illustration of a FADS 200, in accordance with embodiments of the present invention, which is configured to implement air data parameter generating algorithms described below. While characteristics of the algorithms are described below, it must be noted that the specific implementation of the algorithms can be accomplished using any desired techniques and technologies. For example, the methods can be implemented using neural networks or other artificial intelligence algorithms, but this need not be the case in all embodiments. System 200 is one example embodiment of a FADS used on aircraft 100. While FIG. 2 illustrates flush static pressure sensing ports, it is intended to represent air data systems more generally, including those using other types of pressure sensing devices.

As illustrated in FIG. 2, FADS 200 includes N flush static ports 110 (numbered 110-1 through 110-N, respectively). The individual ports each measure a single local static pressure value $p_i$ (for i between 1 and N) related to their respective locations on the aircraft 100. Using algorithms implemented in air data computer circuitry 210, these N pressure values can be combined or used to generate one or more aircraft or system level air data parameters 220 as desired. Examples of these system air data parameters include, but are not limited to, angle-of-attack (AOA), angle-of-sideslip (AOS), and Mach number.

In accordance with embodiments of the present invention, a selected number of pressure readings, $p_i$, are first used to derive a system static pressure Ps and a system total pressure Pt (or alternatively system static pressure Ps and impact pressure $q_c$). The number of ports required depends on the accuracy and locations of the ports, and a different set of ports may be required for each derived parameter. Once Ps and Pt (or Ps and $q_c$) are estimated, both are used along with a selected number of pressure readings to infer system or aircraft AOA and AOS. In this case, predicted Pt and Ps are used to form non-dimensional pressure ratios, $(p_i-Ps_{predicted})/(Pt_{predicted}-Ps_{predicted})$, that are used as inputs for the neural networks and/or other artificial intelligence algorithms implemented within air data computer 210 to predict AOA and AOS. By using this technique, the accuracy of the predicted AOA and AOS values are significantly increased, as can be seen in FIGS. 7 through 10 which are discussed further below.

In accordance with embodiments of the present invention, air data computer 210 includes circuitry (for example suitably configured processors, integrated chips, etc) that is configured to implement the methods illustrated in some or all of FIGS. 3–6. In some embodiments, this circuitry and corresponding algorithms are used to implement neural networks and/or other artificial intelligence algorithms. The methods described below with reference to FIGS. 3–6 provide improved performance of such algorithms, resulting in more accurate and reliable air data parameter calculation.

Figure 3:
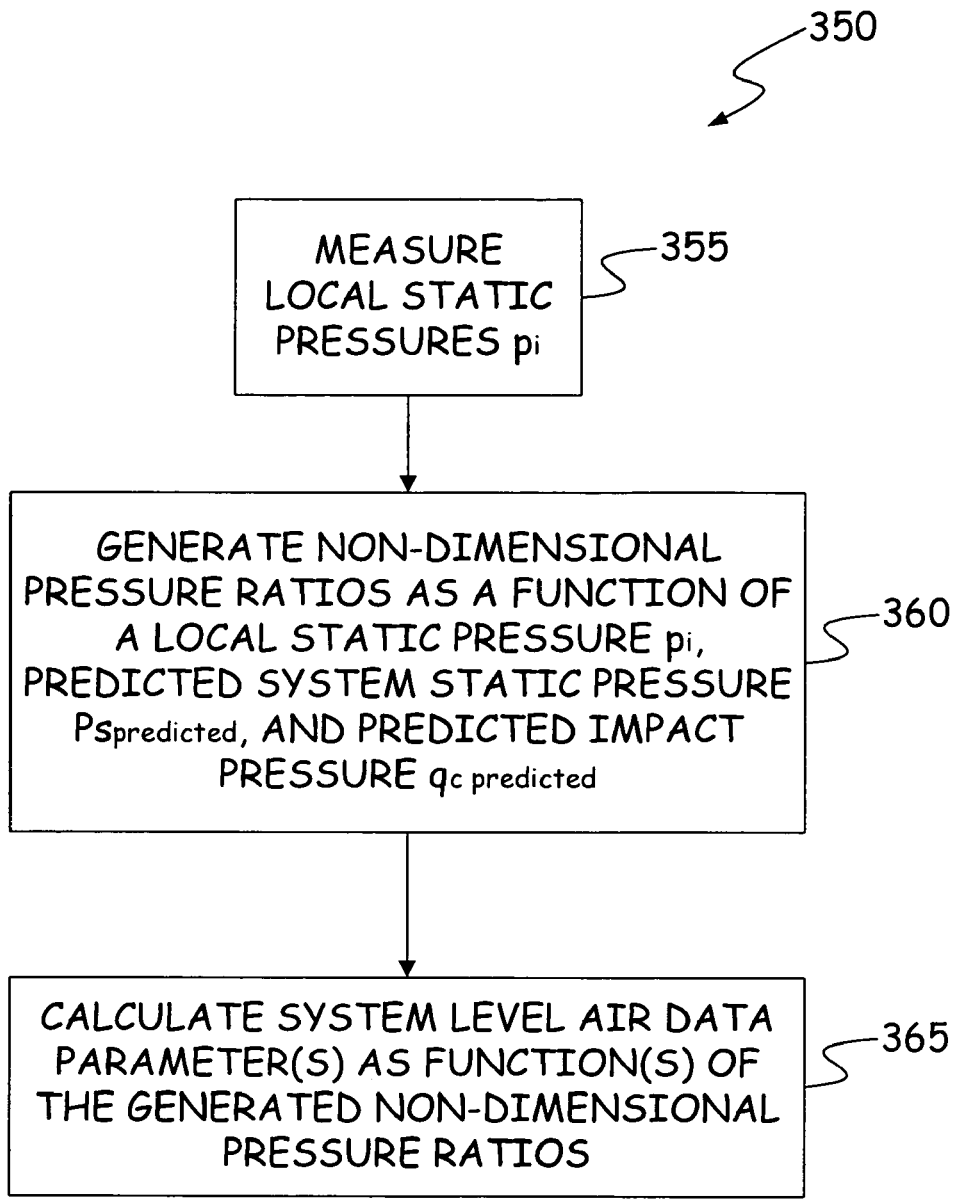
FIGS. 3–6 are flow diagrams illustrating methods in accordance with the present invention.

Referring now to FIG. 3, shown is a flow diagram illustrating a method 350 of calculating an air data parameter in accordance with some embodiments of the present invention. As shown at step 355, the method includes measuring local static pressures $p_i$ from the static pressure sensing ports 110. Then, at step 360, the method is shown to include generating non-dimensional pressure ratios from the local static pressures $p_i$. Each non-dimensional pressure ratio is generated as a function of one of the local static pressures $p_i$, a predicted system static pressure $Ps_{predicted}$, and a predicted impact pressure $q_{c\ predicted}$. Since predicted impact pressure $q_{c\ predicted}$ is equal to $Pt_{predicted} - Ps_{predicted}$, in this step each non-dimensional pressure ratio can be considered to be generated as a function of the predicted total pressure $Pt_{predicted}$ instead of directly as a function of the predicted impact pressure $q_{c\ predicted}$ since these pressures are dependent on each other. As discussed above, in an exemplary embodiment, in step 360, the non-dimensional pressure ratios are each generated, for a particular local static pressure $p_i$, using a relationship that can be represented by the expression shown in Equation 1:

$$(p_i - Ps_{predicted})/(Pt_{predicted} - Ps_{predicted}). \quad \text{Equation 1}$$

Finally, method 350 shown in FIG. 3 includes step 365 of calculating the system level air data parameter as a function of the generated non-dimensional pressure ratios. For example, the non-dimensional pressure ratios defined in Equation 1 can be used as inputs to a suitably trained neural network that provides the system level air data parameter (e.g., AOA, AOS, etc.) as an output. Multiple neural networks or other artificial intelligence algorithms can also be used to provide multiple air data parameters, each as a function of the same set, or different sets, of non-dimensional pressure ratios.

Figure 4:
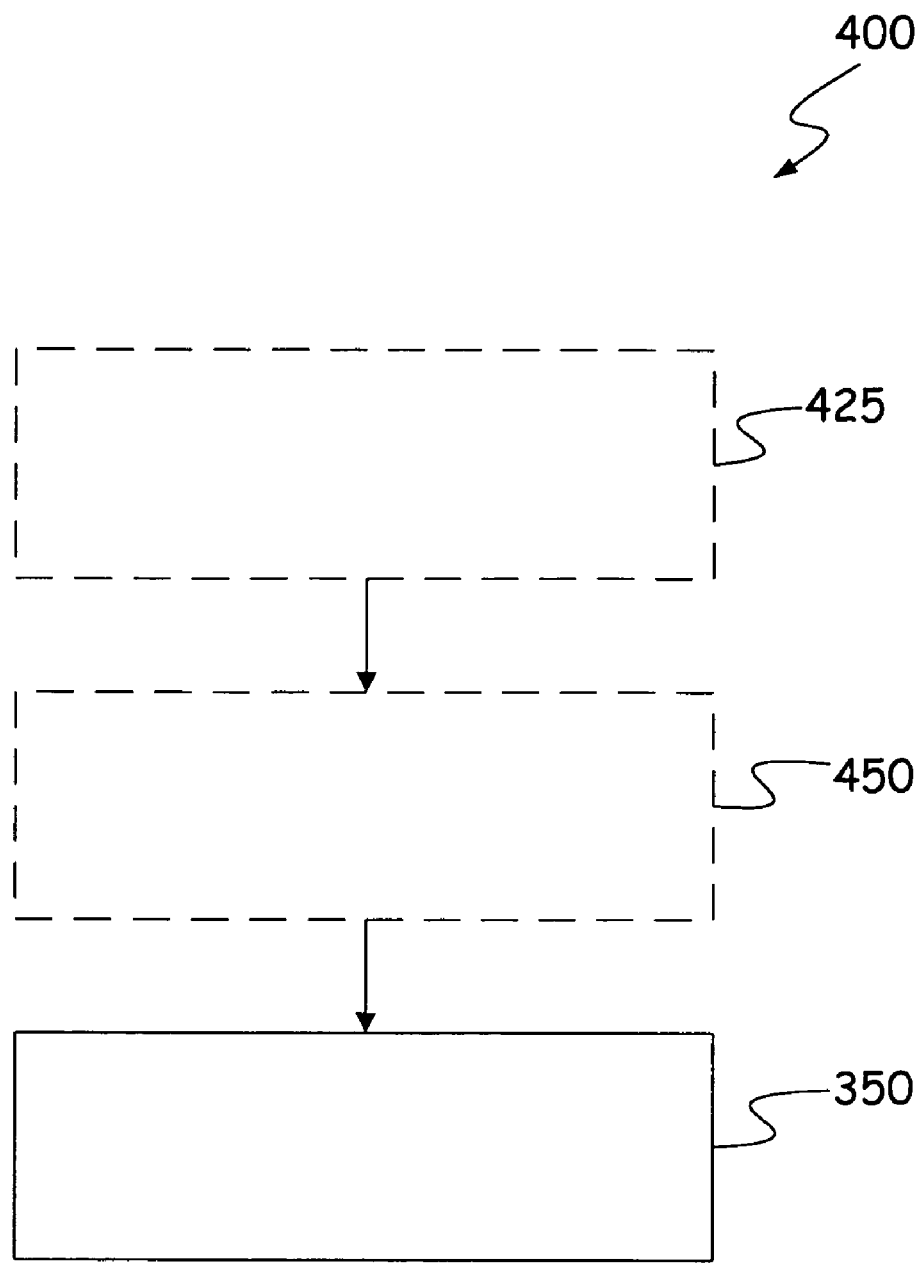
Figure 5:
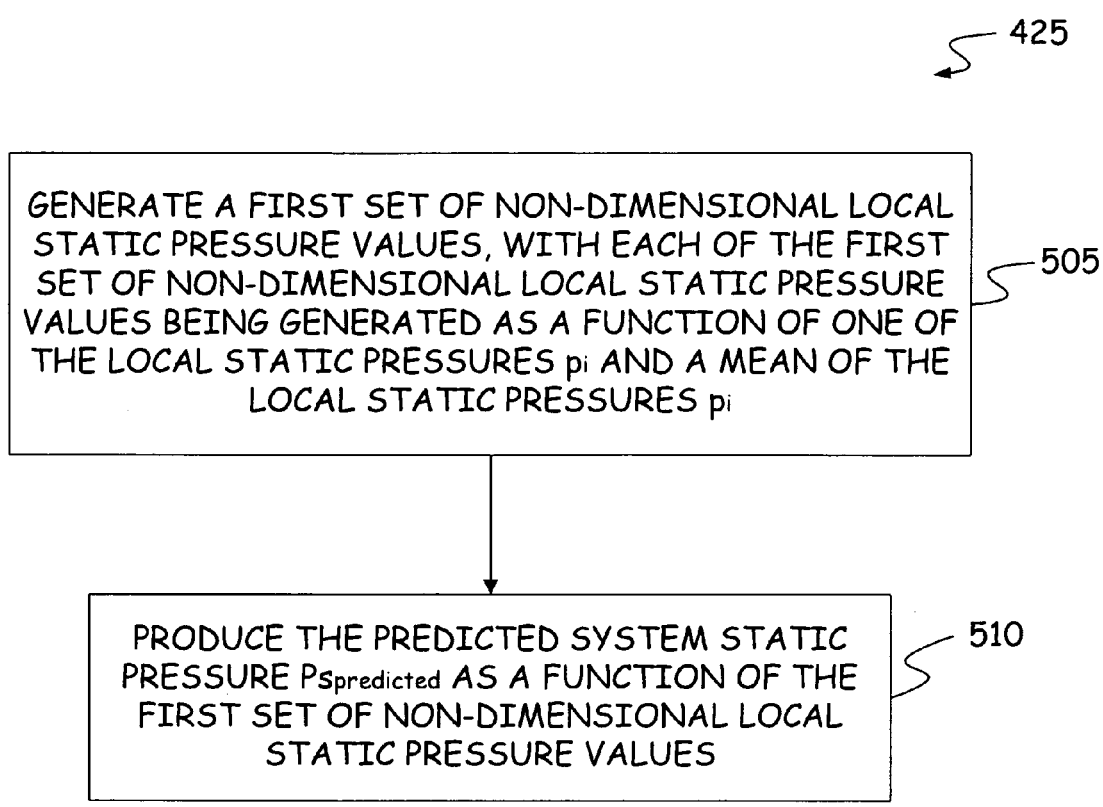
Figure 6:
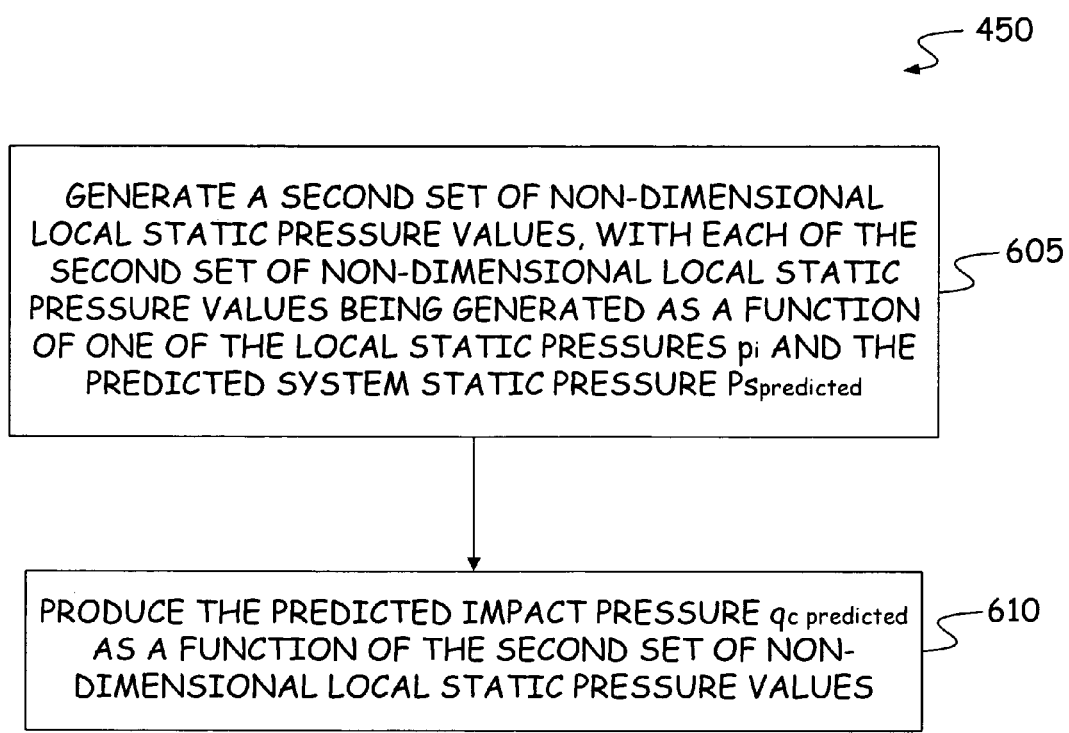

Referring now to FIG. 4, shown in flow diagram form is another method 400, that includes the steps of method 350 shown in FIG. 3, along with the steps of one or both of methods 425 and 450, shown respectively in FIGS. 5 and 6. Since either or both of these methods 425 and 450 can optionally be used as pre-processing steps to those of method 350, the blocks corresponding to methods 425 and 450 are shown in dashed lines to represent their optional nature.

Referring now to FIG. 5, shown is a flow diagram illustrating method 425 of predicting system static pressure $Ps_{predicted}$ used in step 360 of method 350 shown in FIG. 3. It must be noted that method 425 is not the only method of predicting system static pressure $Ps_{predicted}$ that can be used in step 360, and therefore method 350 is not limited to use with a predicted system static pressure $Ps_{predicted}$ produced using method 425.

As shown at step 505, method 425 includes generating a first set of non-dimensional local static pressure values. Each of the first set of non-dimensional local static pressure values is generated as a function of one of the local static pressures $p_i$ and an average or mean $\bar{p}_i$ of the local static pressures. In an exemplary embodiment, each of the first set of non-dimensional local static pressure values is generated using a relationship that can be represented by the expression $$\frac{p_i}{\overline{p_i}}.$$

However, in another embodiment, the first set of non-dimensional local static pressure values is generated by the expression $$\frac{p_i}{p_1}$$

(for i>1). Using a first local static pressure value $p_i$ to non-dimensionalize the other local static pressure values thereby eliminates one input $p_i$.

Then, as shown at step 510, method 425 includes producing the predicted system static pressure $Ps_{predicted}$ as a function of the first set of non-dimensional local static pressure values. This can be accomplished, for example, using a trained neural network or other artificial intelligence algorithm. In an exemplary embodiment, step 510 of producing the predicted system static pressure $Ps_{predicted}$ as a function of the first set of non-dimensional local static pressure values includes the sub-steps of first producing a non-dimensional predicted static pressure value that can be represented by the expression $$\frac{Ps_{predicted}}{\overline{p_i}}.$$

This non-dimensional predicted static pressure value would be, for example, the output of a neural network that takes as inputs the first set on non-dimensional local static pressure values. Then, the non-dimensional predicted static pressure value is re-dimensionalized by multiplying it by the mean $\overline{p_i}$ of the local static pressures $p_i$, to produce the predicted system static pressure $Ps_{predicted}$.

Referring now to FIG. 6, shown is a flow diagram illustrating method 450 of predicting impact pressure $q_{c\ predicted}$ that can be used in step 360 of method 350 shown in FIG. 3. However, method 350 is not limited to use with impact pressures predicted using method 450. As shown at step 605, method 450 includes generating a second set of non-dimensional local static pressure values, with each of the second set of non-dimensional local static pressure values being generated as a function of one of the local static pressures $p_i$ and the predicted system static pressure $Ps_{predicted}$. Then, as shown at step 610, the method includes producing the predicted impact pressure $q_{c\ predicted}$ as a function of the second set of non-dimensional static pressure values.

In one exemplary embodiment, in step 605, the second set of non-dimensional static pressure values is generated using a relationship that can be represented by the expression $$\frac{p_i}{Ps_{predicted}}.$$

In this embodiment, step 610 of producing the predicted impact pressure $q_{c\ predicted}$ includes producing a non-dimensional impact pressure value as a function of the second set of non-dimensional static pressure values. Then, in this embodiment, step 610 also includes re-dimensionalizing the non-dimensional impact pressure value by multiplying it by the predicted system static pressure $Ps_{predicted}$ to produce the predicted impact pressure $q_{c\ predicted}$.

Figure 7:
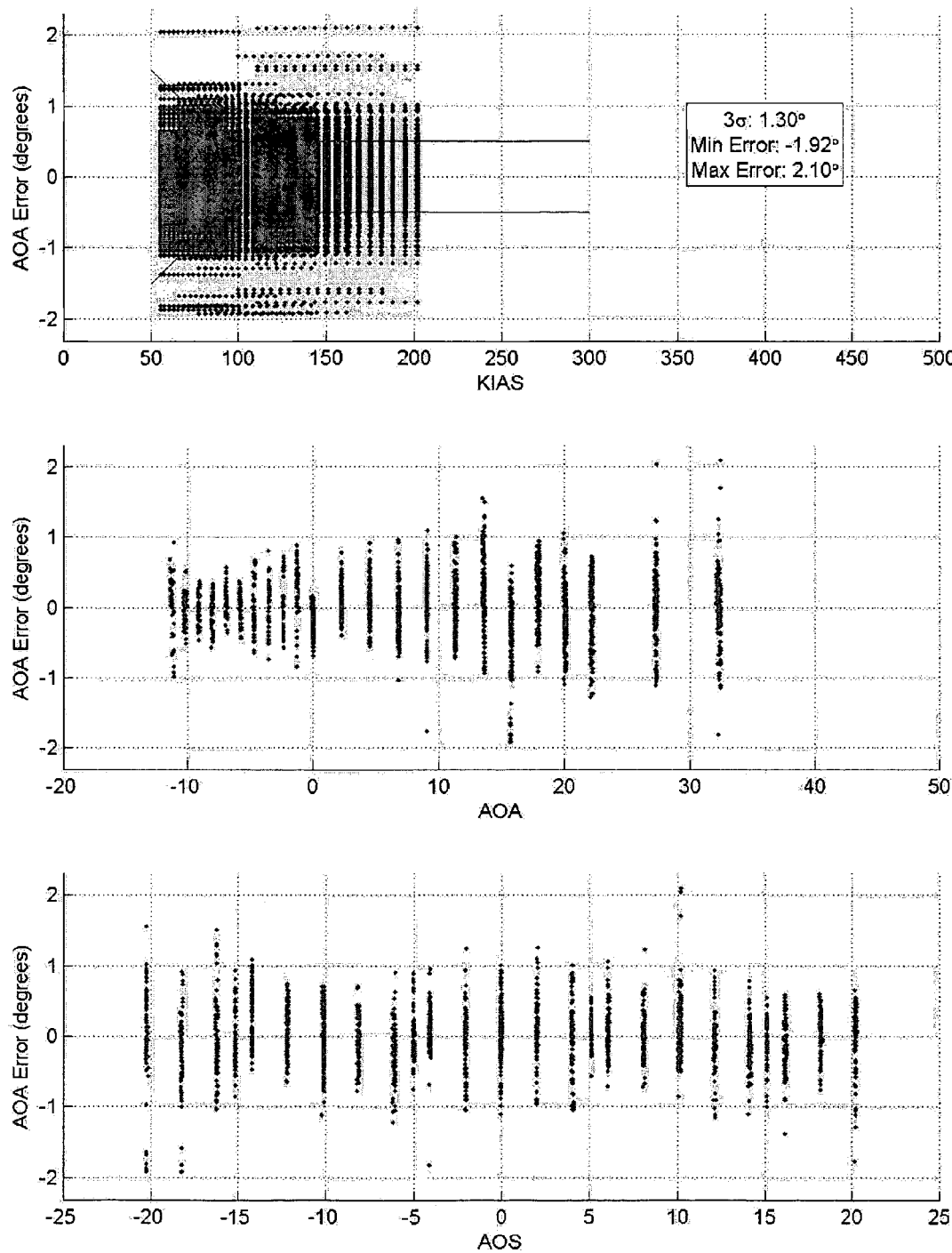
FIGS. 7–10 are plots of AOA and AOS errors illustrating reduction of errors using methods of the present invention.
Figure 8:
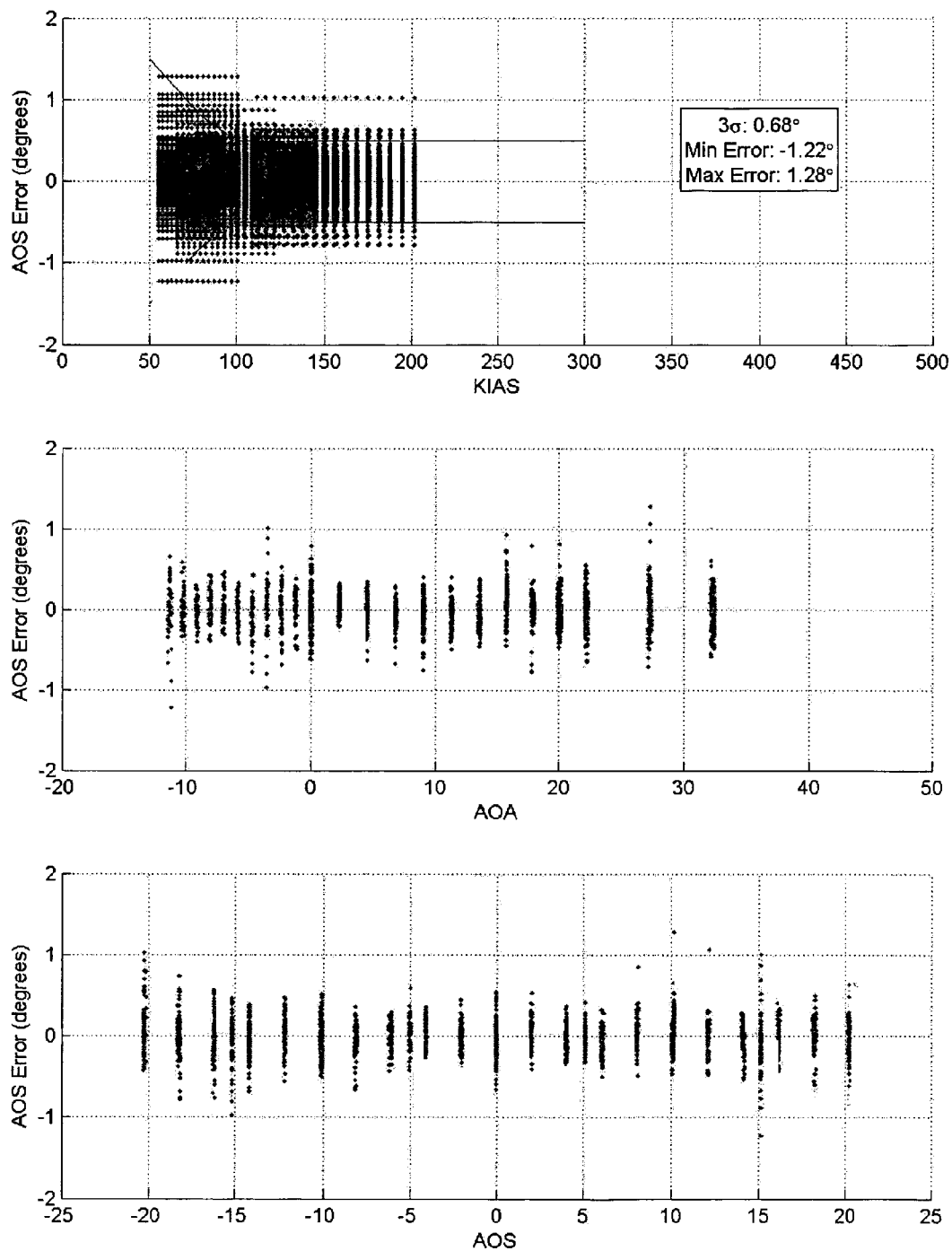
Figure 9:
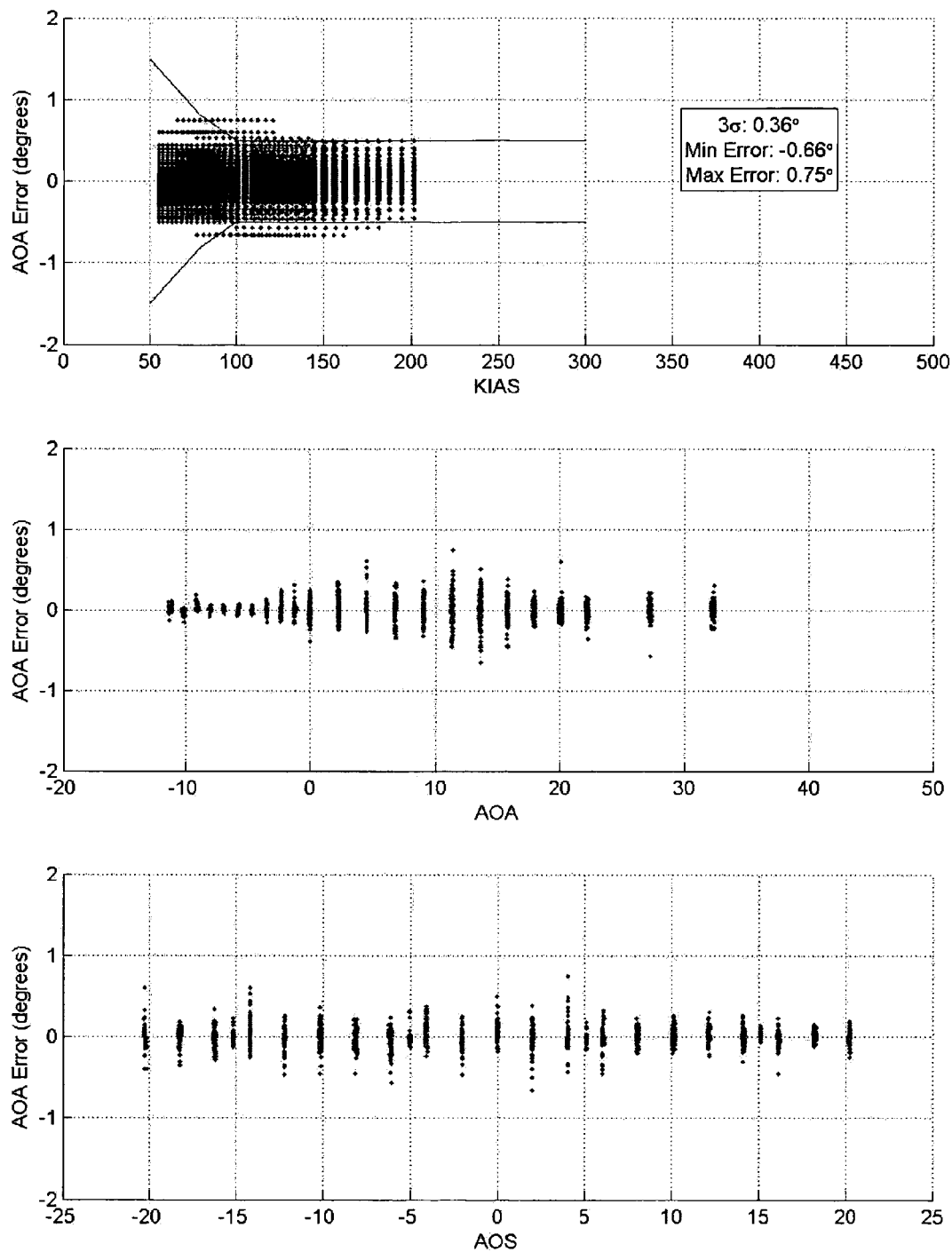
Figure 10:
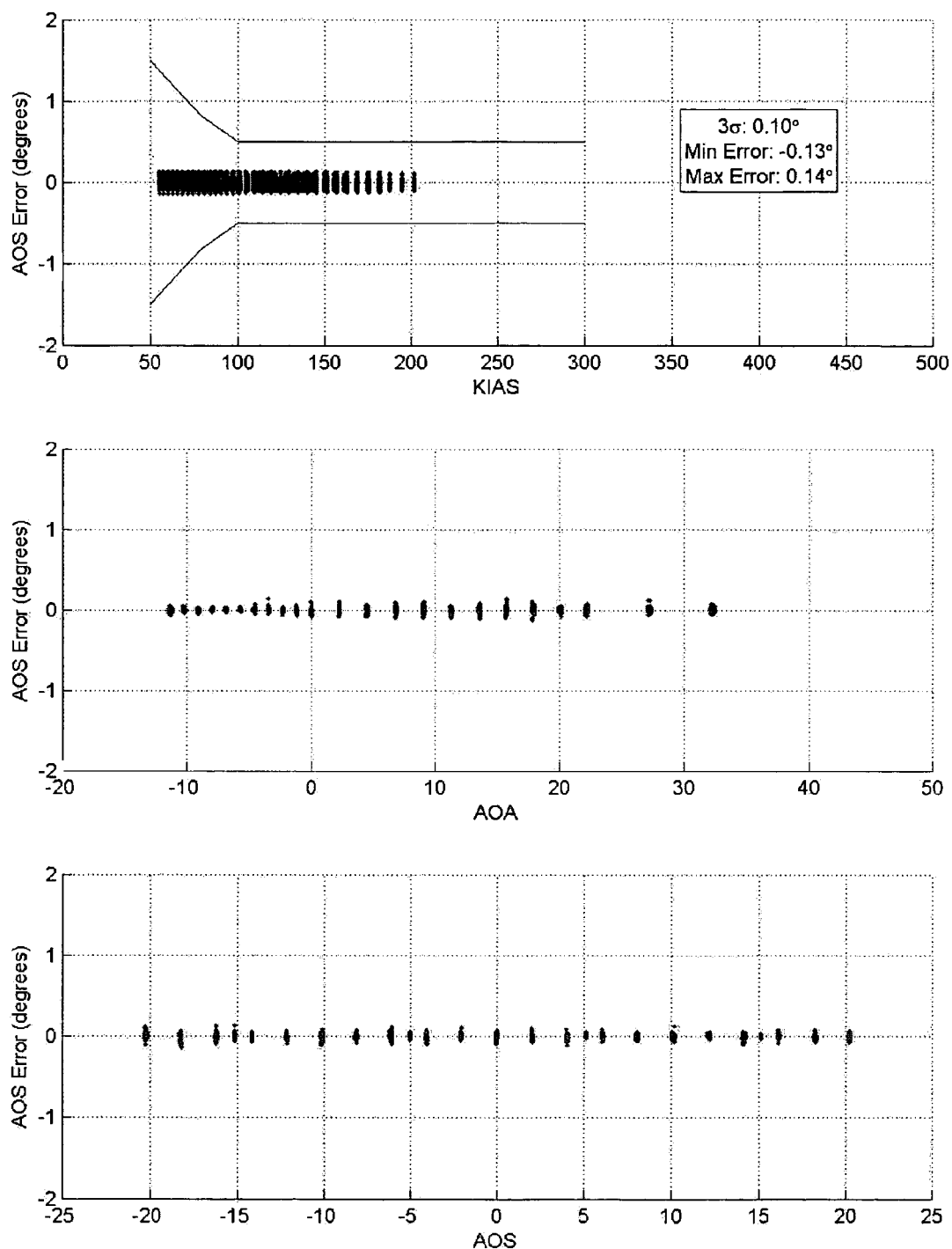

Using the methods illustrated in FIGS. 5 and 6 to predict system static pressure $Ps_{predicted}$ and system total pressure $Pt_{predicted}$, including indirectly by predicting impact pressure $q_{c\ predicted}$, the air data parameters of AOA and AOS can be calculated with significant reduction in errors. For example, FIGS. 7 and 8 illustrate plots of AOA and AOS errors when calculated without predicting system static pressure $Ps_{predicted}$ and system total pressure $Pt_{predicted}$ using these methods. FIG. 7 illustrates plots of AOA errors as a function of KIAS (knots indicated airspeed), as a function of AOA, and as a function of AOS, respectively. Similarly, FIG. 8 illustrates plots of AOS errors as a function of KIAS, as a function of AOA, and as a function of AOS, respectively. In contrast, FIGS. 9 and 10 illustrate the corresponding plots of AOA and AOS errors when calculated using system static pressure $Ps_{predicted}$ and system total pressure $Pt_{predicted}$ generated using these methods. As can be clearly seen, AOA and AOS errors are reduced significantly.

Although the present invention has been described with reference to preferred embodiments, workers skilled in the art will recognize that changes may be made in form and detail without departing from the spirit and scope of the invention. For example, while methods 350, 425 and 450 can be used in a single larger method, this is not required in all embodiments. The method steps shown in each of these methods can be used separately for different purposes if desired.

What is claimed is:

1. A method of calculating a system level air data parameter for an aircraft, the method comprising:
   measuring a plurality of local static pressures $p_i$;
   generating a plurality of non-dimensional pressure ratios, with each non-dimensional pressure ratio being generated as a function of one of the plurality of local static pressures $p_i$, a predicted system static pressure $Ps_{predicted}$, and a predicted impact pressure $q_{c\ predicted}$;
   calculating the system level air data parameter as a function of the generated plurality of non-dimensional pressure ratios;
   providing the system level air data parameter as an output.

2. The method of claim 1, wherein calculating the system level air data parameter as a function of the generated plurality of non-dimensional pressure ratios further comprises calculating at least one of an aircraft angle-of attack (AOA) and an aircraft angle-of sideslip (AOS).

3. The method of claim 1, wherein generating the plurality of non-dimensional pressure ratios also as a function of the predicted impact pressure $q_{c\ predicted}$ further comprises generating the plurality of non-dimensional pressure ratios as a function of a predicted system total pressure $Pt_{predicted}$, where the predicted impact pressure $q_{c\ predicted}$ is equal to the predicted system total pressure $Pt_{predicted}$ minus the predicted system static pressure $Ps_{predicted}$.

4. The method of claim 3, wherein generating the plurality of non-dimensional pressure ratios further comprises generating each non-dimensional pressure ratio for a particular local static pressure $P_i$ using a relationship that can be represented by the expression:

$(p_i - Ps_{predicted})/(Pt_{predicted} - Ps_{predicted})$.

5. The method of claim 1, and before generating the plurality of non-dimensional pressure ratios, further comprising:
generating a first plurality of non-dimensional local static pressure values, with each of the first plurality of non-dimensional local static pressure values being generated as a function of one of the plurality of local static pressures $P_i$ and a mean $\bar{p}_i$ of the plurality of local static pressures $p_i$; and
producing the predicted system static pressure $Ps_{predicted}$ as a function of the first plurality of non-dimensional local static pressure values.

6. The method of claim 5, wherein generating the first plurality of non-dimensional local static pressure values further comprises generating each of the first plurality of non-dimensional local static pressure values using a relationship that can be represented by the expression $$\frac{p_i}{\bar{p}_i}.$$

7. The method of claim 6, wherein producing the predicted system static pressure $Ps_{predicted}$ as a function of the first plurality of non-dimensional local static pressure values comprises:
producing a non-dimensional predicted static pressure value that can be represented by the expression;

$$\frac{Ps_{predicted}}{\bar{p}_i};$$

and
re-dimensionalizing the non-dimensional predicted static pressure value, by multiplying $$\frac{Ps_{predicted}}{\bar{p}_i}$$

by the mean $p_i$ of the plurality of local static pressures $P_i$, to produce the predicted system static pressure $Ps_{predicted}$.

8. The method of claim 5, and before generating the plurality of non-dimensional pressure ratios, further comprising:
generating a second plurality of non-dimensional local static pressure values, with each of the second plurality of non-dimensional local static pressure values being generated as a function of one of the plurality of local static pressures $p_i$, and the predicted system static pressure $Ps_{predicted}$; and
producing the predicted impact pressure $q_{c\ predicted}$ as a function of the second plurality of non-dimensional local static pressure values.

9. The method of claim 8, wherein generating the second plurality of non-dimensional local static pressure values further comprises generating each of the second plurality of non-dimensional local static pressure values using a relationship that can be represented by the expression, $$\frac{p_i}{Ps_{predicted}},$$

and wherein producing the predicted impact pressure $q_{c\ predicted}$ further comprises producing a non-dimensional impact pressure value as a function of the second plurality of non-dimensional local static pressure values.

10. The method of claim 9, and further comprising re-dimensionalizing the non-dimensional impact pressure value by multiplying it by the predicted system static pressure $Ps_{predicted}$ to produce the predicted impact pressure $q_{c\ predicted}$.

11. The method of claim 1, wherein measuring the plurality of local static pressures further comprises measuring the plurality of local static pressures using static pressure sensing ports of a flush air data system.

12. A flush air data system having an air data computer configured to implement the method of claim 1.

13. An air data system comprising:
a plurality of static pressure sensing ports each measuring one of a plurality of local static pressures $p_i$;
an air data computer configured to implement air data parameter calculating steps comprising:
generating a plurality of non-dimensional pressure ratios, with each non-dimensional pressure ratio being generated as a function of one of the plurality of local static pressures $p_i$, a predicted system static pressure $Ps_{predicted}$, and a predicted impact pressure $q_{c\ predicted}$;
calculating a system level air data parameter as a function of the generated plurality of non-dimensional pressure ratios; and
providing the system level air data parameter as an output.

14. The air data system of claim 13, wherein generating the plurality of non-dimensional pressure ratios also as a function of the predicted impact pressure $q_{c\ predicted}$ further comprises generating the plurality of non-dimensional pressure ratios as a function of a predicted system total pressure $Pt_{predicted}$, where the predicted impact pressure $q_{c\ predicted}$ is equal to the predicted system total pressure $Pt_{predicted}$ minus the predicted system static pressure $Ps_{predicted}$.

15. The air data system of claim 14, wherein generating the plurality of non-dimensional pressure ratios further comprises generating each non-dimensional pressure ratio for a particular local static pressure $P_i$ using a relationship that can be represented by the expression:

$(P_i - Ps_{predicted})/(Pt_{predicted} - Ps_{predicted})$.

16. The air data system of claim 15, wherein the air data computer is further configured to implement additional air data parameter calculating steps, before generating the plurality of non-dimensional pressure ratios, comprising:
generating a first plurality of non-dimensional local static pressure values, with each of the first plurality of non-dimensional local static pressure values being generated as a function of one of the plurality of local static pressures $P_i$ and a mean $\bar{p}_i$ of the plurality of local static pressures $P_i$ using a relationship that can be represented by the expression $$\frac{p_i}{\overline{p}_i};$$

and producing the predicted system static pressure $Ps_{predicted}$ as a function of the first plurality of non-dimensional local static pressure values.

17. The air data system of claim 16, wherein producing the predicted system static pressure $Ps_{predicted}$ as a function of the first plurality of non-dimensional local static pressure values further comprises:

producing a non-dimensional predicted static pressure value that can be represented by the expression $$\frac{Ps_{predicted}}{\overline{p}_i};$$

and re-dimensionalizing the non-dimensional predicted static pressure value, by multiplying $$\frac{Ps_{predicted}}{\overline{p}_i}$$

by the mean $\overline{p}_i$ of the plurality of local static pressures $P_i$, to produce the predicted system static pressure $Ps_{predicted}$.

18. The air data system of claim 16, wherein the air data computer is further configured to implement additional air data parameter calculating steps, before generating the plurality of non-dimensional pressure ratios, comprising:

generating a second plurality of non-dimensional local static pressure values, with each of the second plurality of non-dimensional local static pressure values being generated as a function of one of the plurality of local static pressures $p_i$ and the predicted system static pressure $Ps_{predicted}$; and producing the predicted impact pressure $q_{c\ predicted}$ as a function of the second plurality of non-dimensional local static pressure values.

19. The air data system of claim 18, wherein generating the second plurality of non-dimensional local static pressure values further comprises generating each of the second plurality of non-dimensional local static pressure values using a relationship that can be represented by the expression, $$\frac{p_i}{Ps_{predicted}},$$

and wherein producing the predicted impact pressure $q_{c\ predicted}$ further comprises producing a non-dimensional impact pressure value as a function of the second plurality of non-dimensional local static pressure values.

20. The air data system of claim 19, wherein the air data computer is further configured to implement the additional air data parameter calculating step comprising re-dimensionalizing the non-dimensional impact pressure value by multiplying it by the predicted system static pressure $Ps_{predicted}$ to produce the predicted impact pressure $q_{c\ predicted}$.

* * * * *

UNITED STATES PATENT AND TRADEMARK OFFICE
CERTIFICATE OF CORRECTION

PATENT NO. : 7,213,454 B2  Page 1 of 1
APPLICATION NO. : 11/099704
DATED : May 8, 2007
INVENTOR(S) : Travis Schauer, Derrick Hongerholt and Dennis Cronin It is certified that error appears in the above-identified patent and that said Letters Patent is hereby corrected as shown below:

Claim 1 should read as follows:

Column 6, line 53, "pressure ratios;" should read --pressure ratios; and--.

Claim 2 should read as follows:

Column 6, line 59, "angle-of sideslip" should read --angle-of-sideslip--.

Claim 7 should read as follows:

Column 7, line 51, "$p_i$" should read --$\bar{p}_i$--.

Signed and Sealed this

Eleventh Day of November, 2008

JON W. DUDAS
*Director of the United States Patent and Trademark Office*